United States Patent

[11] 3,556,281

[72] Inventors  John L. Margaroli
               Oakland;
               Fred J. Cimperman, San Lorenzo, Calif.
[21] Appl. No. 773,447
[22] Filed      Nov. 5, 1968
[45] Patented   Jan. 19, 1971
[73] Assignee   George W. Ashlock Company
                San Leandro, Calif.
                a corporation of California

[54] APPARATUS AND METHOD FOR HANDLING AND PITTING PRUNES
     4 Claims, 8 Drawing Figs.

[52] U.S. Cl. .................................................... 198/33
[51] Int. Cl. ..................................................... B65g 47/24
[50] Field of Search ......................................... 198/33(R1),
                           131; 146/17, 27, 244, (Inquired)

[56]                 References Cited
                UNITED STATES PATENTS
2,265,515   12/1941   Carroll ......................... 198/33(R1)
2,815,622   12/1957   Barrett ......................... 198/33(R1)
3,153,473   10/1964   Margaroli ..................... 198/33(R1)
3,469,612    9/1969   Margaroli ..................... 146/17
                   FOREIGN PATENTS
  392,110    3/1924   Germany ...................... 198/33(R1)

Primary Examiner—Edward A. Sroka
Attorney—Naylor & Neal

ABSTRACT: A prune pitter which utilizes the pitting chuck conveyor also as the pickup or feed conveyor, the pickup portion of said conveyor having associated therewith means for selectively adjusting the size of the prune pickup pockets in order to prevent the entry into any one of such pockets of more than one prune, said pickup portion of the conveyor having also associated therewith means for preventing the conveying of nonpocketed fruit to the pitting portion of the conveyor.

PATENTED JAN 19 1971

INVENTORS
JOHN L. MARGAROLI
BY FRED J. CIMPERMAN

Naylor & Neal
ATTORNEYS

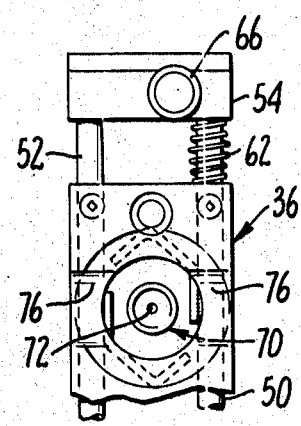
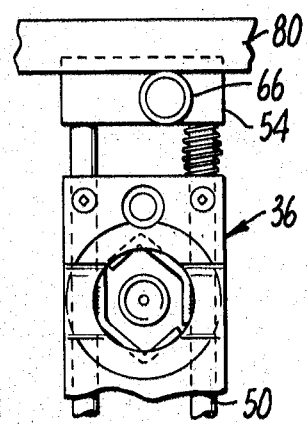
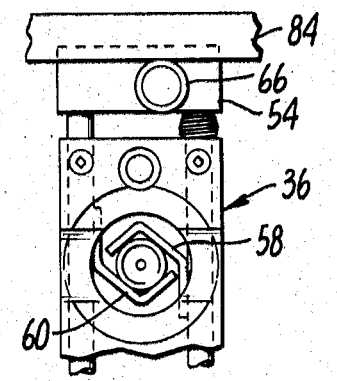
FIG. 3.  FIG. 4.  FIG. 5.
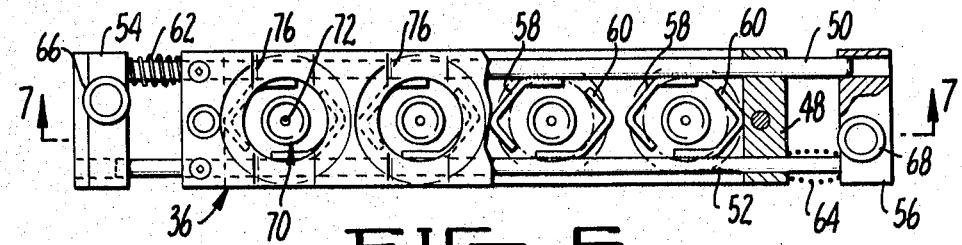
FIG. 6.
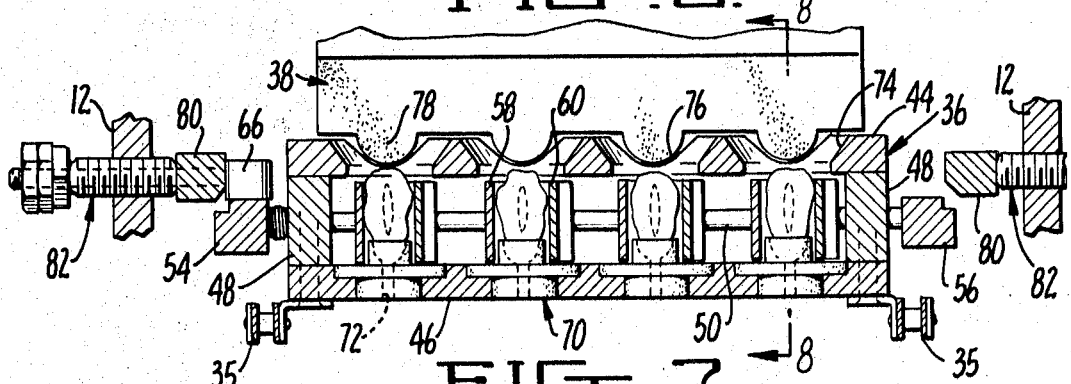
FIG. 7.
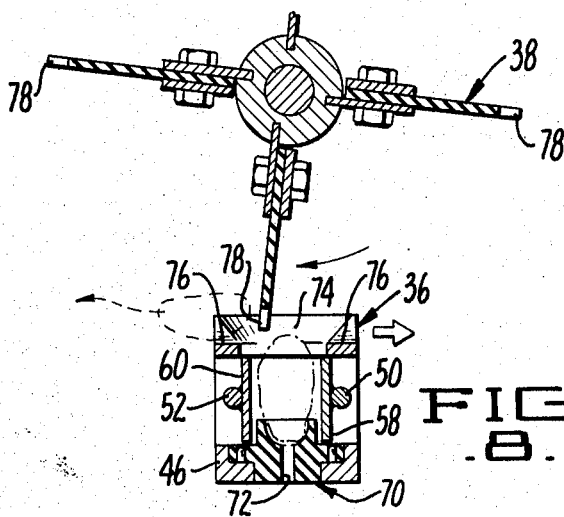
FIG. 8.
INVENTORS
JOHN L. MARGAROLI
BY FRED J. CIMPERMAN
Naylor & Neal
ATTORNEYS

APPARATUS AND METHOD FOR HANDLING AND PITTING PRUNES

SUMMARY OF THE INVENTION

Ashlock U.S. Pat. No. 2,688,352 discloses fruit-pitting apparatus adapted for the pitting of prunes and dates. The apparatus described therein comprises a feed conveyor, described in more detail in Ashlock U.S. Pat. No. 2,630,205, which forms a moving bottom wall of a fruit supply hopper and is provided with fruit pickup pockets adapted to receive the fruit with the major axes horizontally disposed. The feed conveyor transfers the fruit to the pockets of a pitting conveyor so that their major axes are vertically disposed, the pitting conveyor pockets being provided with fruit-gripping members adapted to be moved together to position and hold the fruit for pitting and to then move apart to release the pitted fruit for discharge from the machine.

The subject matter hereof consists of improvements in the described prior art apparatus. One such improvement is the utilization of the pitting conveyor as the feed conveyor. The fruit are picked up with their major axes vertically disposed within the conveyor pockets.

A further improvement over the described prior art apparatus resides in providing the fruit pickup reach of the conveyor with means for selectively spacing apart the fruit-gripping members so as to prevent the entry of more than one fruit into a pocket.

Still a further improvement over the described prior art apparatus resides in the provision of new and improved means for sweeping the fruit pickup reach of the conveyor to insure that nonpocketed fruit are not conveyed out of the hopper area.

The results of these improvements are: the overall length of the subject prune-pitting machine is reduced to the order of about half of the length of the described prior art fruit pitter; and the percentage of conveyor pockets occupied by prunes to be pitted is substantially increased over that obtainable with the described prior art apparatus.

THE DRAWINGS

FIG. 3 is a plan view of a fruit conveyor pocket, the fruit-gripping members of the pocket being shown in dotted outline in their farthest apart position;

FIG. 4 is a view similar to that of FIG. 3, but showing the fruit-gripping members for the pocket in a more closely spaced position, i.e., such as to prevent the entry into the pocket of more than one fruit or prune;

FIG. 5 is a view similar to that of FIG. 4, but showing the gripping members of the pocket in a still closer together position, i.e., in a fruit-gripping position;

FIG. 6 is a plan view, partly in section, of a complete fruit holder unit;

FIG. 7 is a view in section taken along line 7-7 of FIG. 6; and

FIG. 8 is a view in section taken along line 8-8 of FIG. 7.

Figure 1:
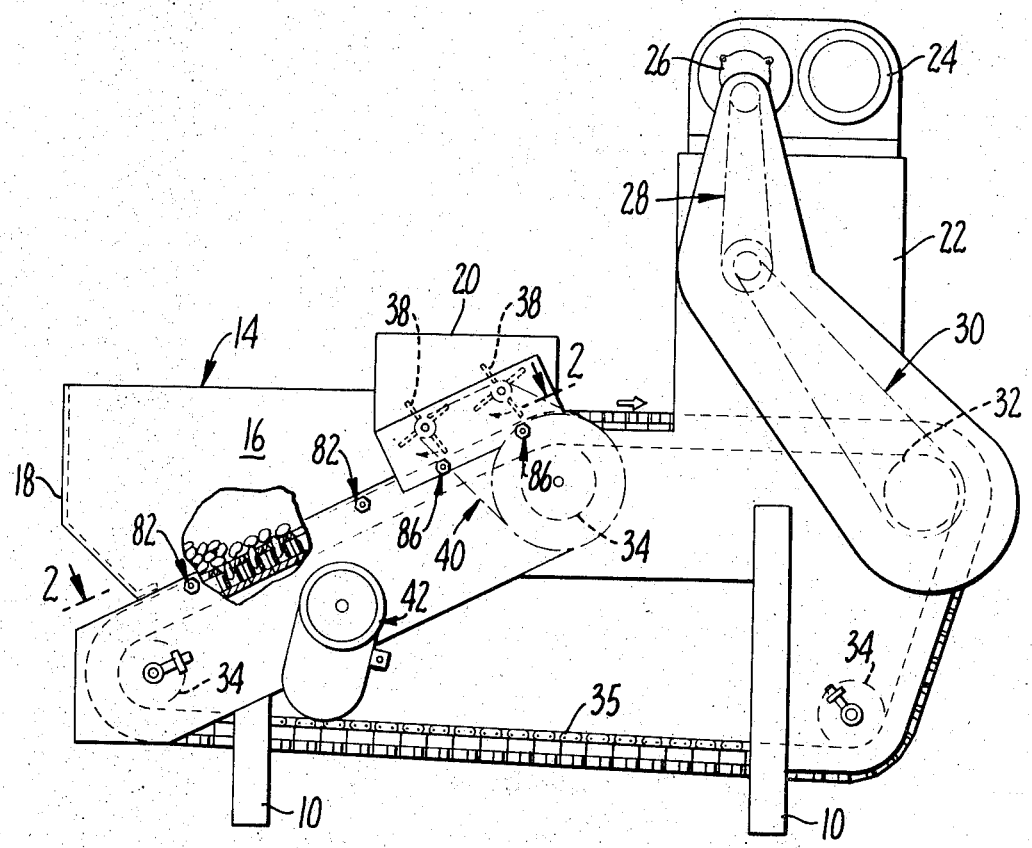
FIG. 1 is a view in side elevation, partially broken away and sectionalized, of the improved prune pitting apparatus of the invention.
Figure 2:
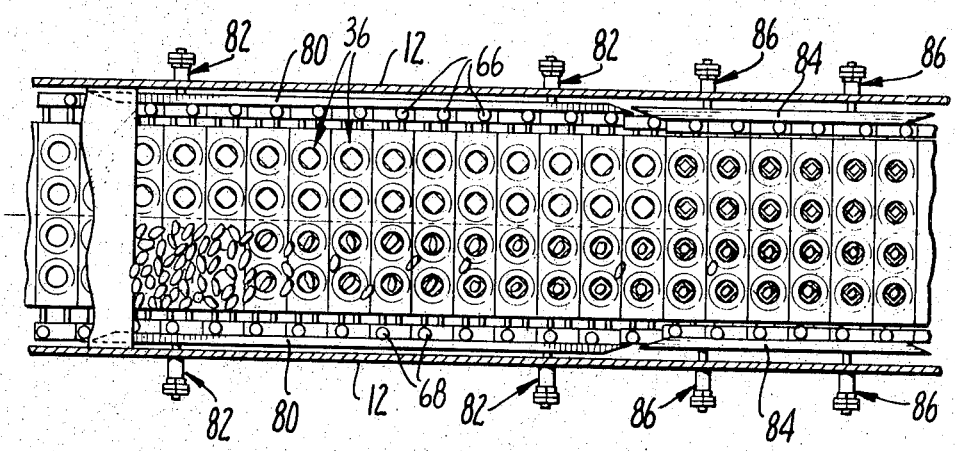
FIG. 2 is a view in section taken along line 2-2 of FIG. 1.

With reference to the drawings, the subject machine comprises a support frame including legs 10 and sideplates 12, a hopper 14 formed of a pair of sidewalls 16 and an endwall 18, a hood 20 supported above the upper end of the hopper and adapted to house a water-spray system, a pitting head housing 22 supporting motor 24 and speed reducer 26, drive means 28 interconnecting the reducer 26 and the pitting head assembly, not shown, drive means 30 interconnecting speed reducer 26 and conveyor drive sprockets 32 mounted on a shaft journaled for rotation in sideplates 12, pairs of conveyor idler sprockets 34 also mounted on shafts journaled for rotation in sideplates 12, chains 35 trained around sprockets 32 and 34, fruit holders 36 carried by chains 35, guide rails, not shown, carried by the sideplates 12 for supporting the upwardly inclined reach of the pocket conveyor, which forms a moving bottom wall for hopper 14, and the horizontally disposed upper or pitting reach of the conveyor, a pair of paddle wheels rotatably mounted at the upper end of the pickup reach of the pocket conveyor and adapted to be rotated in a clockwise direction, as viewed in FIG. 1, by drive means 40, and a vibrator mechanism indicated generally at 42 adapted to impart a rapid oscillatory movement to the guide rails for the upwardly inclined reach of the pocket conveyor.

Each fruit holder 36 comprises an upper plate 44, a lower plate 46, end members 48 interconnecting plates 44 and 46, rods 50 and 52 slidably supported by end members 48, roller carrier 54 secured to rod 50 and adapted to slide on rod 52, roller carrier 56 secured to rod 52 and adapted to slide on rod 50, pocket wall members 58 attached to rod 50, pocket wall members 60 attached to rod 52, springs 62 and 64 which urge the roller carriers 54 and 56 away from the end members 48 and tend to maintain the outermost of the pocket defining members 58 and 60 in engagement with end members 48, a roller 66 carried by roller carrier 54, and a roller 68 carried by roller carrier 56.

Removably mounted in lower plate 46 are pitting cups indicated generally by 70, said cups being formed of a suitable flexible material such as rubber, being adapted to support prunes in an upright position for pitting, and having pit ejection openings 72.

Upper plate 44 is formed with funnellike openings 74 for guidance of the prunes into pockets defined by said openings 74, by the upper ends of the cups 70, and by the opposed sidewall members 58 and 60.

Means are provided to insure that prunes do not become lodged or wedged in generally horizontal positions within the funnellike openings 74 of the pockets, said means comprising arcuate recesses 76 formed in plate 36 at the leading and trailing sides of the pockets, said recesses being adapted to be swept by the complementally formed protuberances 78 formed on the paddle elements of paddle wheels 38. The paddle elements of each wheel are flexible. The wheels are rotated at a rate on the order of about 300 r.p.m. and the conveyor travels at a rate on the order of about 400 pockets per minute moving past the paddle wheel sweeping points. Thus, each pocket mouth is swept a number of times by the fingers of each paddle wheel. The provision of the second, or upper, paddle wheel insures that a horizontally wedged prune which on relatively rare occasions gets by the first wheel will be dislodged by the second wheel. When such a prune is dislodged by the second wheel it is driven into the first wheel and thereupon driven downhill by the latter.

Means are provided in association with the upwardly inclined fruit pickup reach of the conveyor to move the pocket-defining members 58 and 60 a predetermined degree toward each other, e.g., from the wide open position of FIG. 3 to the intermediate position of FIG. 4, to prevent any second prune from getting into any one pocket with its major axis in an upright position, said means comprising a pair of cam rails 80 mounted on adjustable support means 82 carried by the sideplates 12. Depending upon the average size of prune being handled, the cam rails 80 will be adjusted either toward or away from sideplates 12 so that the rollers 66 and 68 will be appropriately moved relative to the fruit holder end members 48 to control the size of the fruit pockets so that the pockets will be of size to readily receive in an endwise position one of the prunes being handled, but so that the pockets will be too small to receive in endwise position another, or second, prune.

Further cam rails 84 supported by adjustable mounting means 86 carried by the sideplates 12 are provided to variably control, in accordance with the particular size of prune being handled, the degree of further closure together of the pocket-defining members 58 and 60, as in FIG. 5, to lightly grip the prunes during the time the prunes pass beneath the paddle wheels 38 to prevent dislodgement of prunes from the pockets by said wheels.

The apparatus of the invention is adapted for use in connection with the handling for pitting of dates as well as prunes.

We claim:

1. Apparatus adapted to pick up elongated fruit such as prunes and the like and convey them with their major axes disposed generally normal to their path of movement, said apparatus comprising a conveyor having an upwardly inclined reach forming a movable bottom wall of a fruit-supply hopper, said hopper having a pair of opposed sidewalls, a plurality of fruit-receiving pockets formed in said conveyor, each pocket being defined by a fruit-support cup forming the lower portion of said pocket, by a pair of wall members forming an intermediate portion of said pocket, and by a funnellike passageway extending through a platelike member, said passageway forming the upper portion of said pocket, first means connecting said wall members to said conveyor for movement of the same toward and away from each other, second means adjustably mounted on the sidewalls of said hopper adapted to actuate said first means and thereby selectively control the space between said wall members, whereby the endwise admission of fruit into said pockets is limited to one fruit per pocket, a pair of opposed grooves or notches formed in said platelike member at the leading and trailing sides of each pocket, and scavenger means disposed to traverse each pair of opposed grooves or notches and thereby remove from the upper portion of each pocket any fruit residing therein with its major axis disposed generally transversely of said upper portion.

2. The apparatus of claim 1, said scavenger means being comprised of a paddle wheel member, the paddle elements of which are provided with protuberances adapted to pass through the pairs of opposed grooves, and means for rotating said paddle wheel member so that its lower portion moves in a direction which is opposite the direction in which said conveyor reach is moved.

3. Apparatus adapted to pick up elongated fruit such as prunes and the like and convey them with their major axes disposed generally normal to their path of movement, said apparatus comprising a conveyor, a plurality of fruit-receiving pockets formed in said conveyor, each pocket being defined in part by a fruit support cup forming the lower portion of said pocket and by a funnellike passageway extending through a platelike member and forming the upper portion of said pocket, a pair of opposed grooves or notches formed in said platelike member at the leading and trailing sides of each pocket, and scavenger means disposed to traverse each pair of opposed grooves or notches and thereby remove from the upper portion of each pocket any fruit residing therein with its major axis disposed generally transversely of said upper portion.

4. The apparatus of claim 3, said scavenger means being comprised of a paddle wheel member, the paddle elements of which are provided with protuberances adapted to pass through the pairs of opposed grooves or notches, and means for rotating said paddle wheel member so that its lower portion moves in a direction which is opposite the direction in which said conveyor is moved.